United States Patent [19]

Caldicott

[11] 4,061,198
[45] Dec. 6, 1977

[54] ELECTRONIC WEIGHING SYSTEMS

[75] Inventor: Jack Richard Caldicott, Stockport, England

[73] Assignee: Railweight Inc. (U.K.) Limited, England

[21] Appl. No.: 730,963

[22] Filed: Oct. 8, 1976

[30] Foreign Application Priority Data

Oct. 10, 1975 United Kingdom ............ 41703/75

[51] Int. Cl.² .................. G01G 19/52; G01G 23/14; G01G 3/14
[52] U.S. Cl. .................................. 177/50; 177/165; 177/211; 73/1 B; 323/75 B
[58] Field of Search ............... 177/25, 50, 134, 165, 177/211; 323/75 B, 75 N; 73/1 B

[56] References Cited

U.S. PATENT DOCUMENTS

| | | |
|---|---|---|
| 2,869,853 | 1/1959 | Pratt .................................. 177/165 |
| 2,998,090 | 8/1961 | Watson ............................... 177/211 |
| 3,203,223 | 8/1965 | Petrow ................................. 73/1 B |
| 3,211,991 | 10/1965 | Potter ................................. 323/75 N |
| 3,333,649 | 8/1967 | Schafstellar ........................ 177/211 |
| 3,559,059 | 1/1971 | Martin et al. .................... 177/211 X |
| 3,692,129 | 9/1972 | Pratt et al. ......................... 177/211 |

*Primary Examiner*—George H. Miller, Jr.
*Attorney, Agent, or Firm*—George H. Gerstman

[57] ABSTRACT

A weighing system is described in which a weighing platform is operatively coupled to a transducer arrangement included in an electrical bridge circuit having connected therein a tare resistor arrangement for balancing out the tare weight of the platform. Means are provided for selectively isolating the effect of the tare resistor arrangement from the bridge circuit so that the system output indicates the sum of the tare weight of the platform and the weight of any load on the platform, thereby enabling the weighing system to be checked using the weight of the platform.

4 Claims, 1 Drawing Figure

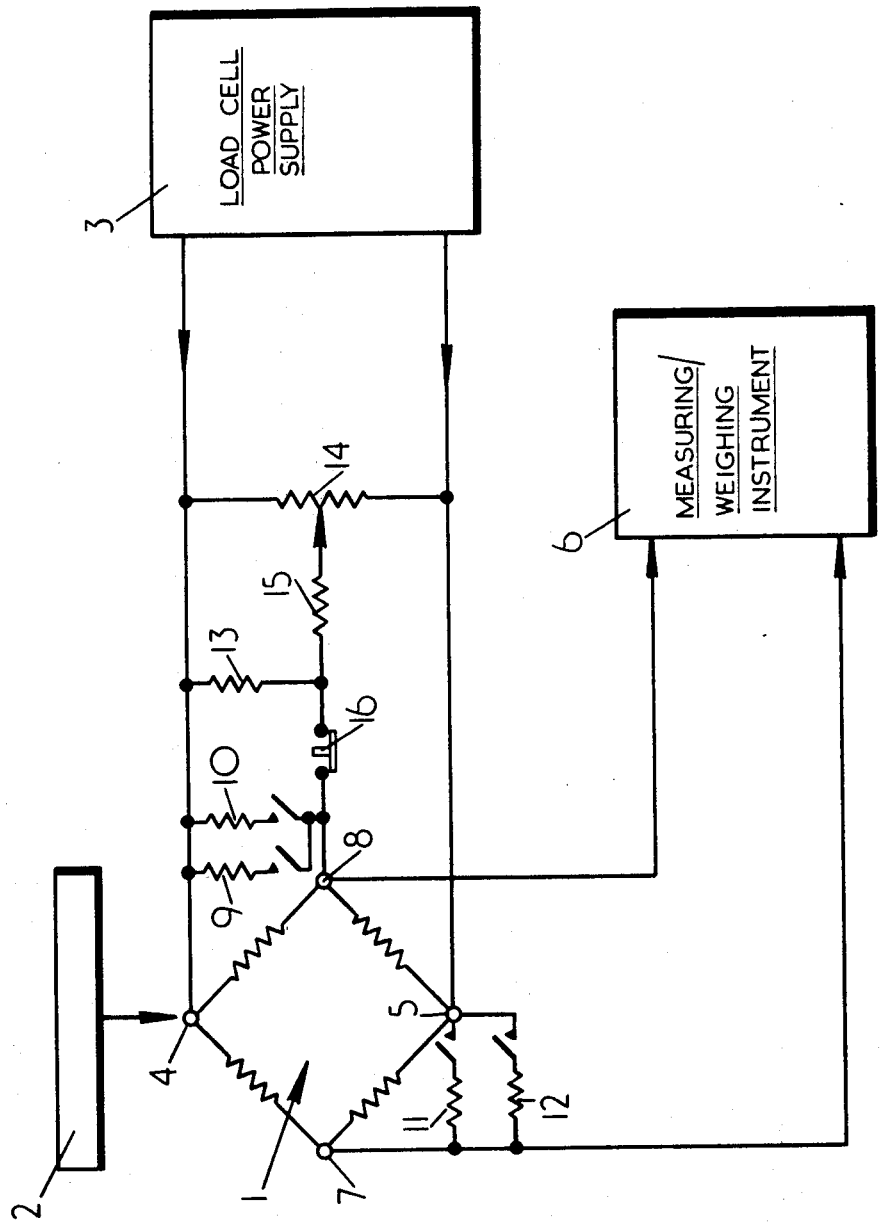

ELECTRONIC WEIGHING SYSTEMS

This invention relates to electronic weighing systems of the kind in which a weighing platform is operatively coupled to a transducer arrangement which is included in an electrical bridge circuit. In such systems it is customary to balance out the tare weight of the platform by the addition of a so-called tare resistor to the bridge circuit so that with nothing on the platform the weight indication is zero.

To reduce weighing errors owing to zero drift or changes in gain and the like resulting from temperature changes, ageing of components, variations of supply or the like, means are often provided to check the accuracy of the system. Such means can comprise a high stability resistor of predetermined value which is connected, between weighments, into the bridge circuit to simulate the application of a known weight to the weighing platform and thereby to check, and correct if necessary, the accuracy of the weight indication. However, such an operation checks only the electronic circuitry and does not check the transducer arrangement, for example, its conversion co-efficient or linearity. To check the transducer arrangement it is necessary from time to time to transport standard weights to the weighing platform. For example, in the case of a weigh bridge for the weighing of railway freight cars, the weights may be a ton each and require the services of a crane to load them one by one onto the weigh bridge.

An object of the invention is to provide means for checking the correct operation of the transducer arrangement at will without the need to use special weights.

According to the invention, in a weighing system in which a weighing platform is operatively coupled to a transducer arrangement included in an electrical bridge circuit having connected therein a tare resistor for balancing out the tare weight of the platform means are provided selectively to isolate the effect of the tare resistor from the bridge circuit so that the system output indicates the sum of the tare weight of the platform and the weight of any load on the platform.

Such a means not only enables the weight of the platform to be used as a check weight when the platform is unloaded, it also enables the weight of the platform to be added to arbitrary weights spread throughout the scale so that scale linearity can be checked. Although the platform cannot be regarded as a standard weight, its weight will be fairly accurately known from frequent check operations and irrespective of its absolute value, the platform weight will be constant throughout a check operation. Thus, if the system is operating correctly, isolation of the effect of the tare resistor will result in the same indicated weight differential irrespective of the weight of any load on the platform.

An embodiment of the present invention will now be described, by way of example, with reference to the accompanying drawing. The drawing schematically illustrates component parts of a weighing system for the weighing of railway freight cars. The operation of these component parts is described in greater detail in our co-pending British Patent Application No. 21703/75.

Referring to the drawing, the illustrated weighing system comprises a load cell wheatstone bridge 1. A weighbridge platform 2 is supported on or otherwise operatively coupled to the bridge 1 in a known manner. A load cell power supply 3 provides power to input terminals 4 and 5 of the bridge and a measuring/weighing instrument 6 receives the output of the bridge from terminals 7 and 8. Precision calibration resistors 9, 10, 11 and 12 are connected across the load cells in series with respective switches. These switches may be operated to connect resistors 9 and 11 across the load cells, to provide a first calibration check point on the load/output characteristic of the bridge 1, or to connect resistors 10 and 12 across the load cells to provide a second calibration check point.

A fixed value tare resistor 13 is connected across an arm of the bridge 1 and balances out most of the tare weight of the weighbridge platform. The remainder of the tare weight is balanced out by a balance/tare adjustment potentiometer 14 the track of which is connected across the bridge supply and the wiper of which injects current via a resistor 15 into one arm of the wheatstone bridge 1 via a normally closed switch 16. The wiper is connected via the switch 16 to that output 8 of the bridge to which the resistor 13 is also connected.

When the switch 16 is opened, the resistors 13 and 15 and the potentiometer 14 are disconnected from the bridge 1. Thus, when the switch 16 is opened the system provides an output which is indicative of the sum of the weight of the weighbridge platform and the weight of any load on the platform.

When it is desired to check the weighbridge using a railway freight car, the weight of the unloaded weighbridge is first indicated by operating switch 16 to disconnect the tare resistors. An axle of the freight car is then moved onto the weighbridge and the difference between the weight indications with and without the tare resistors connected to the bridge circuit are noted. More axles are progressively moved onto the weighbridge and the weight differences obtained by operating the switch 16 are noted for each additional axle until the range of the weighing system has been covered. If the linearity of the system is good the weight differences will be the same and not related to the arbitrary weight on the weighbridge at any one time. Since the operation of the electronic circuitry will have been checked by the known means any defect of operation can be attributed to the transducer arrangement or to the support or coupling thereto of the weighing platform.

By means of the invention it is possible for the weighing system operators to make regular checks and to detect readily any deviations in linearity or accuracy and therefore long periods between the tedious operation of checking with standard weights can be tolerated.

What is claimed is:

1. A weighing system in which a weighing platform is operatively coupled to a transducer arrangement included in an electrical bridge circuit having connected therein a tare resistor arrangement for balancing out the tare weight of the platform, comprising means for selectively isolating the effect of the tare resistor arrangement from the bridge circuit so that the system output indicates the sum of the tare weight of the platform and the weight of any load on the platform.

2. A weighing system according to claim 1, wherein the tare resistor arrangement comprises a fixed value resistor connected across an arm of the bridge circuit and an adjustable resistor for balancing the bridge.

3. A weighing system according to claim 2, wherein the adjustable resistor comprises a potentiometer having its track connected across the supply to the bridge and its wiper connected via a resistor to the output terminal of the bridge to which said fixed value resistor is connected.

4. A weighing system according to claim 3, wherein the selective isolating means comprises a switch for breaking the connection between said output terminal and said fixed value resistor and said potentiometer wiper.

* * * * *